(12) United States Patent
Tsai

(10) Patent No.: US 7,295,379 B2
(45) Date of Patent: Nov. 13, 2007

(54) LED LIGHT CONVERGING SYSTEM

(75) Inventor: Shang-An Tsai, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 0 days.

(21) Appl. No.: 11/396,548

(22) Filed: Apr. 4, 2006

(65) Prior Publication Data

US 2007/0047092 A1    Mar. 1, 2007

(30) Foreign Application Priority Data

Aug. 24, 2005  (TW) ............... 94128912 A

(51) Int. Cl.
*G02B 3/00* (2006.01)
*G02B 9/06* (2006.01)
(52) U.S. Cl. ..................... 359/651; 359/794
(58) Field of Classification Search ............ 359/651, 359/794
See application file for complete search history.

(56) References Cited

U.S. PATENT DOCUMENTS 5,584,568 A * 12/1996 Corbasson et al. ......... 362/268

\* cited by examiner

*Primary Examiner*—Ricky Mack
*Assistant Examiner*—William C Choi
(74) *Attorney, Agent, or Firm*—Winston Hsu

(57) ABSTRACT

An LED light converging system includes an LED light source, and first and second lens units aligned in sequence along an optical axis. The LED light source provides source light. The first lens unit has a first focal length, and is disposed forwardly of and is spaced apart from the LED light source by a first distance less than the first focal length such that a virtual image of the source light provided by the LED light source is formed rearwardly of the LED light source. The second lens unit has a second focal length, is disposed forwardly of the first lens unit, and is spaced apart from the virtual image of the source light by a second distance larger than the second focal length such that a real image of the source light provided by the LED light source is formed forwardly of the second lens unit.

11 Claims, 3 Drawing Sheets

LED LIGHT CONVERGING SYSTEM

BACKGROUND OF THE INVENTION

1. Field of the Invention

The invention relates to a light converging system, more particularly to an LED light converging system based on imaging techniques.

2. Description of the Related Art

The development of light-emitting diodes (LED) is becoming more mature nowadays, and their application to lighting devices is more and more common. In applying the LED to projectors, how to effectively collect the diverging source light provided by the LED is an important issue to be researched and developed upon. In addition, since the angular range of the source light provided by the LED is large, it is difficult to use the LED as a point light source.

Conventional light source systems for projectors can be categorized into two groups. One type of conventional light source systems utilizes ultra-high pressure (UHP) arc lamps and an array of lenses to converge and homogenize light. This type of conventional light source system requires a large-sized reflector, and the source light provided by such a system contains a large amount of ultra-violet light and infrared light, which can damage other optical components in the projectors and shorten the service lives thereof. The other type of conventional light source systems utilizes integration rods for light-homogenization. The integration rod needs to be sufficiently long to ensure higher efficiency in homogenizing light. Moreover, this type of conventional light source system requires a set of transmission lenses disposed to receive homogenized light exiting the integration rod for further projection, which results in a corresponding increase in the size of the projectors equipped with such a system.

SUMMARY OF THE INVENTION

Therefore, the object of the present invention is to provide an LED light converging system that is based on imaging techniques, and that is smaller in size as compared to the prior art.

According to the present invention, there is provided an LED light converging system that includes an LED light source, a first lens unit and a second lens unit aligned in sequence along an optical axis. The LED light source provides source light. The first lens unit has a first focal length, and is disposed forwardly of and is spaced apart from the LED light source by a first distance less than the first focal length such that a virtual image of the source light provided by the LED light source is formed rearwardly of the LED light source. The second lens unit has a second focal length, is disposed forwardly of the first lens unit, and is spaced apart from the virtual image of the source light by a second distance larger than the second focal length such that a real image of the source light provided by the LED light source is formed forwardly of the second lens unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
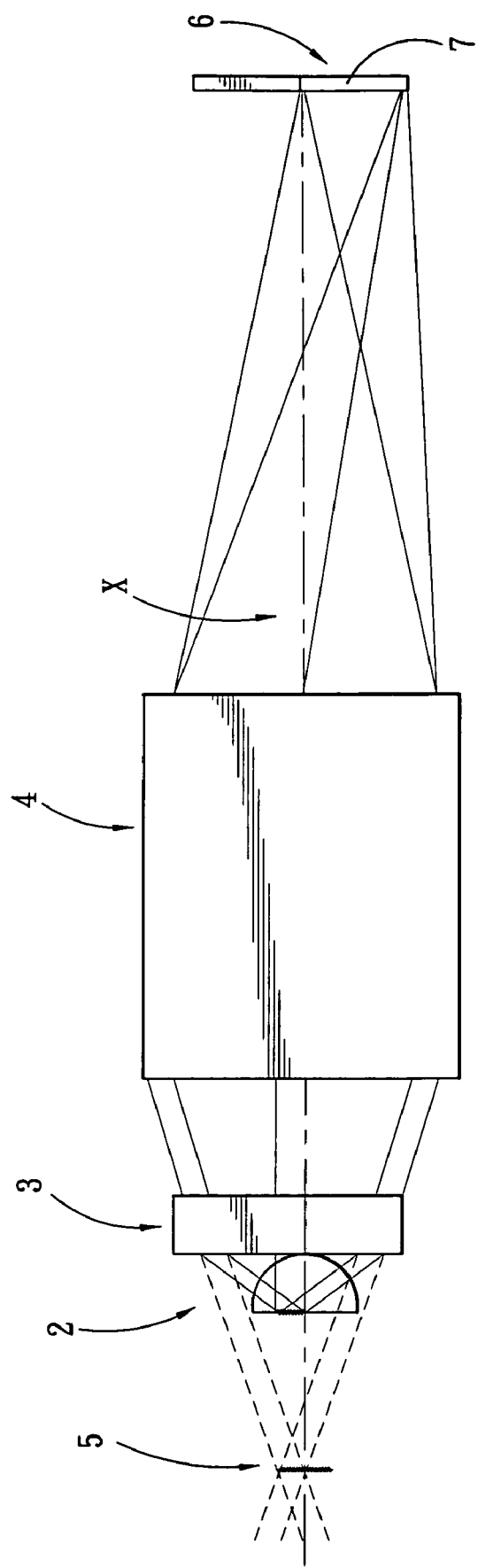
FIG. 1 is a schematic view of the preferred embodiment of an LED light converging system according to the present invention.
Figure 2:
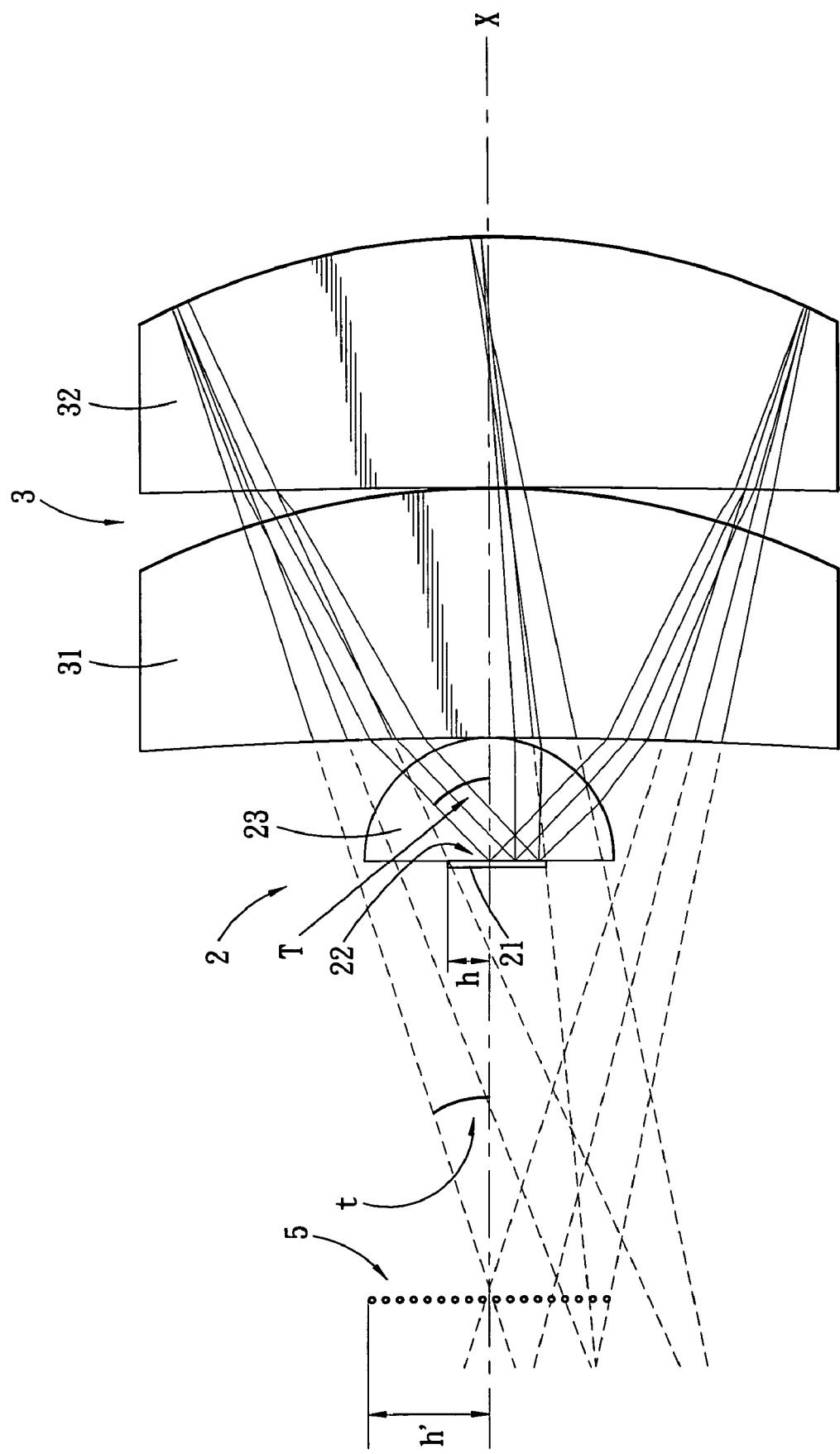
FIG. 2 is a fragmentary schematic view of the preferred embodiment, illustrating an LED light source and a first lens unit.

As shown in FIG. 1 and FIG. 2, the preferred embodiment of an LED light converging system according to the present invention includes an LED light source 2, a first lens unit 3 and a second lens unit 4 aligned in sequence along an optical axis (X).

The LED light source 2 provides source light, and includes a substrate 21, an array 22 of three light-emitting diodes mounted on the substrate 21, and a hemispherical lens 23 that covers the array 22 of the light-emitting diodes. The light-emitting diodes are capable of emitting the source light within the primary color wavelength ranges, i.e., red, green and blue wavelength ranges, respectively. In this embodiment, the hemispherical lens 23 has an index of refraction that is equal to 1.51. The source light emitted by the array 22 of the light-emitting diodes exits the hemispherical lens 23 after being refracted and propagates along the optical axis (X). It should be noted herein that since the feature of the present invention does not reside in the specific construction of the LED light source 2, which is known in the art, further details of the same will be omitted herein for the sake of brevity. In addition, the number of the array 22 of the light-emitting diodes included in the LED light converging system according to this embodiment is merely illustrative. There may be a plurality of arrays 22 of the light-emitting diodes in other embodiments of the present invention depending on specific design criteria for desired illumination brightness of the LED light converging system.

The first lens unit 3 has a first focal length, which preferably ranges between 8.7 and 17.4 mm. The first lens unit 3 is disposed forwardly of and is spaced apart from the LED light source 2 by a first distance less than the first focal length such that a virtual image 5 of the source light provided by the LED light source 2 is formed rearwardly of the LED light source 2.

In this embodiment, the first lens unit 3 is a doublet converging lens, which includes first and second positive lenses 31, 32. It should be noted herein that the number of lenses included in the first lens unit 3 is not limited to two in other embodiments of the present invention. The second positive lens 32 is disposed forwardly of the first positive lens 31. Preferably, each of the first and second positive lenses is a plano-convex lens. Presented below in Table 1 are parameter values of the first and second positive lenses 32, 32 for this embodiment.

TABLE 1

| Lens | Radius of curvature (mm) | Distance to the next surface (mm) | Aperture size (mm) | Material |
|---|---|---|---|---|
| First positive lens 31 | ∞ | 7 | 11 | PSK54 glass |
|  | −14.4 | 0 | 11 |  |
| Second positive lens 32 | ∞ | 7 | 11 | PSK54 glass |
|  | −15.4 | 0 | 11 |  |

Figure 3:
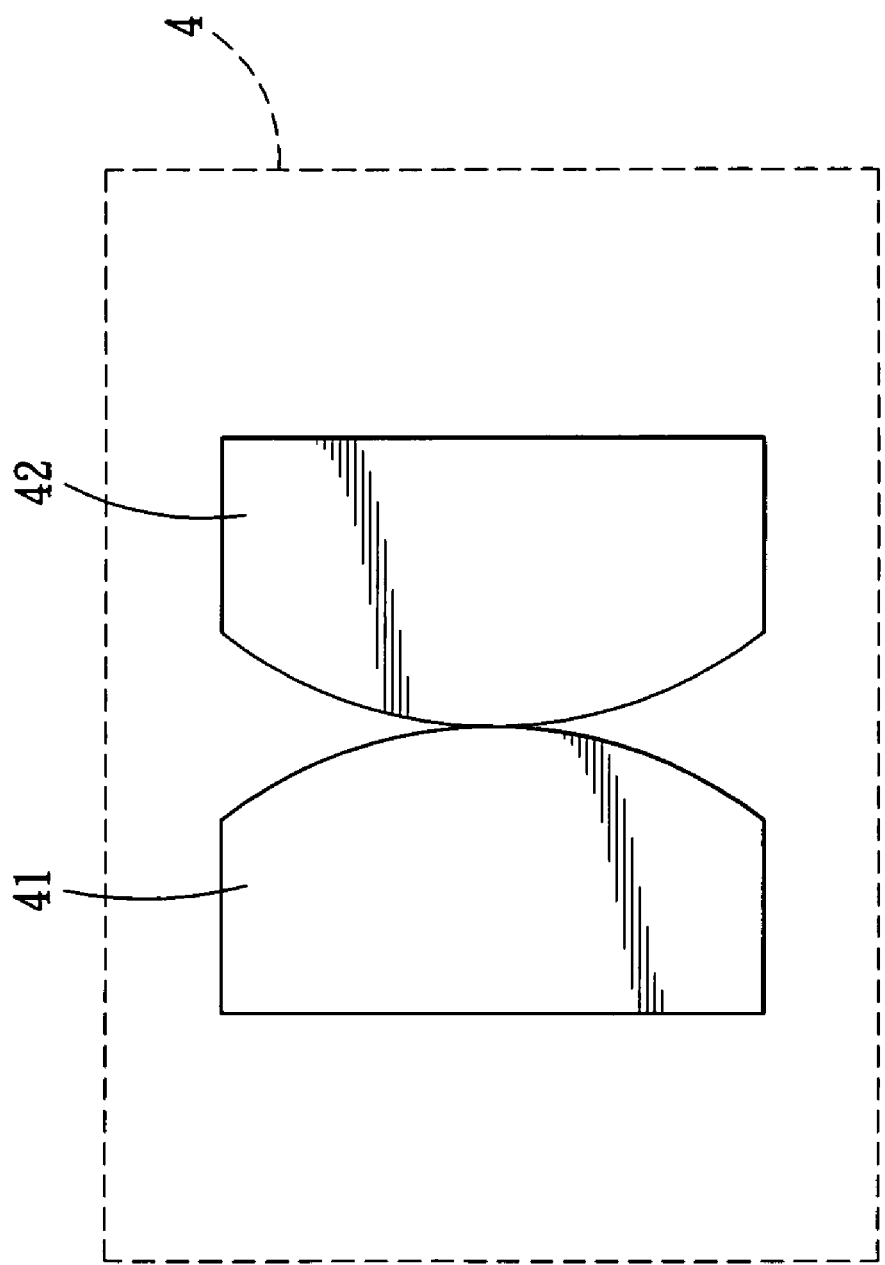
FIG. 3 is a schematic view of a second lens unit according to the preferred embodiment.

With further reference to FIG. 3, the second lens unit 4 has a second focal length, which preferably ranges between 30 and 42 mm. The second lens unit 4 is disposed forwardly of the first lens unit 3, and is spaced apart from the virtual image 5 of the source light by a second distance larger than the second focal length such that a real image 6 of the source light provided by the LED light source 2 is formed forwardly of the second lens unit 4. Preferably, the second lens unit 4 is spaced apart from the first lens unit 3 by a third distance ranging between 13 and 26 mm.

In this embodiment, the second lens unit 4 is a doublet converging lens, which includes third and fourth positive lenses 41, 42. It should be noted herein that the number of lenses included in the second lens unit 4 is not limited to two in other embodiments of the present invention. The fourth positive lens 42 is disposed forwardly of the third positive lens 41. Preferably, each of the third and fourth positive lenses 41, 42 is a plano-convex lens. Presented below in Table 2 are parameter values of the third and fourth positive lenses 41, 42 for this embodiment.

TABLE 2

| Lens | Radius of curvature (mm) | Distance to the next surface (mm) | Aperture size (mm) | Material |
|---|---|---|---|---|
| Third positive lens 41 | ∞ | 9 | 16 | BK7 glass |
|  | −36 | 0 | 16 |  |
| Fourth positive lens 42 | 36 | 9 | 16 | BK7 glass |
|  | ∞ | 0 | 16 |  |

The operating principle of the present invention will be described in detail hereinbelow with reference to FIG. 1 and FIG. 2. First, define the half height of the substrate 21 of the LED light source 2 with respect to the optical axis (X) to be (h). The source light is emitted by the array 22 of the light-emitting diodes at an angle (T) with respect to the optical axis (X).

The source light is first refracted by the hemispherical lens 23 toward the optical axis (X), then enters the first lens unit 3. The first and second positive lenses 32, 32 of the first lens unit 3 converge the source light. Since the LED light source 2 is disposed within the first focal length of the first lens unit 3, a magnified virtual image 5 of the source light is formed rearwardly of the LED light source 2 if the LED light source 2 is taken as an object plane. Next, define the half height of the virtual image 5 with respect to the optical axis (X) to be (h'). Light projected from the virtual image 5 forms an angle (t) with the optical axis (X). Preferably, $(1/3)T < t < (1/2)T$.

After passing through the first lens unit 3, the source light enters the second lens unit 4. As mentioned hereinabove, the second distance, i.e., the distance between the virtual image 5 of the source light and the second lens unit 4, is larger than the second focal length. As a result, forwardly of the second lens unit 4, a real image 6 of the source light can be formed on an image plane at a predefined location. A light modulator 7 can be disposed on the image plane to receive the source light exiting the second lens unit 4. Defining the magnification of the second lens unit 4 to be (m), then the half height (H) of the real image 6 is equal to m×h'. A person skilled in the art should know that by varying the third distance between the first and second lens units 3, 4, the magnification (m) of the second lens unit 4 can be adjusted to adjust the size of the real image 6, i.e., the size of area illuminated by the LED light converging system.

It should be noted herein that the first, second, third and fourth positive lenses 31, 32, 41, 42 used in this embodiment are merely illustrative, and that the first and second lens units 3, 4 may be implemented using combinations of positive and negative lenses in other embodiments of the present invention.

In sum, the LED light converging system according to the present invention has the following effects and advantages:

1. With the cooperation of the first and second lens units 3, 4, the LED light converging system according to the present invention does not require the integration rod, the reflector, or the set of transmission lenses as in the prior art. Therefore, the size of the LED light converging system is smaller than that of the prior art.

2. Adjustments to the size of the area illuminated by the LED light converging system can be easily performed by adjusting the third distance between the first and second lens units 3, 4.

3. The first and second lens units 3, 4 cooperate to converge and collect the diverging source light provided by the array 22 of the light-emitting diodes toward the image plane, thus overcoming the difficulty in using the light-emitting diodes as a point light source in the prior art.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An LED light converging system comprising an LED light source, a first lens unit and a second lens unit aligned in sequence along an optical axis, said LED light source providing source light;
  wherein said first lens unit has a first focal length and is disposed forwardly of and is spaced apart from said LED light source by a first distance less than the first focal length for forming a virtual image of the source light provided by said LED light source rearward of said LED light source; and
  wherein said second lens unit has a second focal length, is disposed forwardly of said first lens unit, and is spaced apart from the virtual image of the source light by a second distance larger than the second focal length for forming a real image of the source light provided by said LED light source forward of said second lens unit.

2. The LED light converging system as claimed in claim 1, wherein said LED light source includes an array of light-emitting diodes, each capable of emitting the source light within a corresponding primary color wavelength range for producing source light of three primary colors, and a hemispherical lens that covers said light-emitting diodes.

3. The LED light converging system as claimed in claim 1, wherein said first lens unit is a doublet converging lens.

4. The LED light converging system as claimed in claim 3, wherein said first lens unit includes first and second positive lenses.

5. The LED light converging system as claimed in claim 4, wherein each of said first and second positive lenses is a plano-convex lens.

6. The LED light converging system as claimed in claim 4, wherein said second lens unit is a doublet converging lens.

7. The LED light converging system as claimed in claim 6, wherein said second lens unit includes third and fourth positive lenses.

8. The LED light converging system as claimed in claim 7, wherein each of said third and fourth positive lenses is a plano-convex lens.

9. The LED light converging system as claimed in claim 1, wherein the first focal length ranges between 8.7 and 17.4 mm.

10. The LED light converging system as claimed in claim 1, wherein the second focal length ranges between 30 and 42 mm.

11. The LED light converging system as claimed in claim 1, wherein said second lens unit is spaced apart from said first lens unit by a third distance ranging between 13 and 26 mm.

* * * * *